(12) United States Patent
Liu

(10) Patent No.: US 6,690,420 B1
(45) Date of Patent: Feb. 10, 2004

(54) INTEGRATED CIRCUIT ARCHITECTURE OF CONTACT IMAGE SENSOR FOR GENERATING BINARY IMAGES

(75) Inventor: Dongtai Liu, Fremont, CA (US)

(73) Assignees: Syscan, Inc., San Jose, CA (US); Shenzhen Syscan Technology Co., Limited.

( * ) Notice: Subject to any disclaimer, the term of this patent is extended or adjusted under 35 U.S.C. 154(b) by 0 days.

(21) Appl. No.: 09/245,192

(22) Filed: Feb. 5, 1999

(51) Int. Cl.[7] .......................... H04N 5/217; H04N 9/04; H04N 5/335; G06K 9/40
(52) U.S. Cl. ................. 348/241; 348/210.99; 348/298; 382/237; 382/275
(58) Field of Search ............................. 348/210.99, 241, 348/249–252, 298, 308, 255; 358/471, 474, 482, 446, 445, 465; 382/232, 237, 137, 251, 275

(56) References Cited

U.S. PATENT DOCUMENTS

| | | | | |
|---|---|---|---|---|
| 3,965,290 A | * | 6/1976 | Tisue | 358/466 |
| 4,012,715 A | * | 3/1977 | Essenmacher | 382/272 |
| 5,221,976 A | * | 6/1993 | Dash et al. | 358/474 |
| 5,267,053 A | * | 11/1993 | Potucek et al. | 358/446 |
| 5,514,865 A | * | 5/1996 | O'Neil | 358/474 |
| 5,539,532 A | * | 7/1996 | Watanabe | 358/447 |
| 5,617,489 A | * | 4/1997 | Adachi | 382/275 |
| 5,832,122 A | * | 11/1998 | Shimazaki | 358/457 |
| 5,892,590 A | * | 4/1999 | Ida et al. | 358/474 |
| 5,988,504 A | * | 11/1999 | Smitt | 358/456 |
| 6,032,864 A | * | 3/2000 | Hamasuna | 358/448 |
| 6,104,510 A | * | 8/2000 | Hu et al. | 358/509 |
| 6,118,114 A | * | 9/2000 | Fujimoto et al. | 358/482 |
| 6,304,826 B1 | * | 10/2001 | Liu | 702/104 |

* cited by examiner

*Primary Examiner*—Wendy R. Garber
*Assistant Examiner*—Lin Ye
(74) *Attorney, Agent, or Firm*—Joe Zheng

(57) ABSTRACT

An integrated circuit architecture of contact image sensor for generating bi-level images and associated method are disclosed. The architecture comprises an image sensor, an amplifier, an analyzing circuit and a comparator, in one particular embodiment, it further comprises an electrically erasable programmable read-only memory (EEPROM). The amplifier is coupled to the image sensor and receives electronic signals therefrom and further receives pairs of gain and offset from the EEPROM. The electronic signals are adjusted in the amplifier respectively and sequentially in accordance to the pairs of gain and offset. The analyzing circuit determines a dynamic threshold to the comparator that subsequently produces the bi-level images.

19 Claims, 13 Drawing Sheets

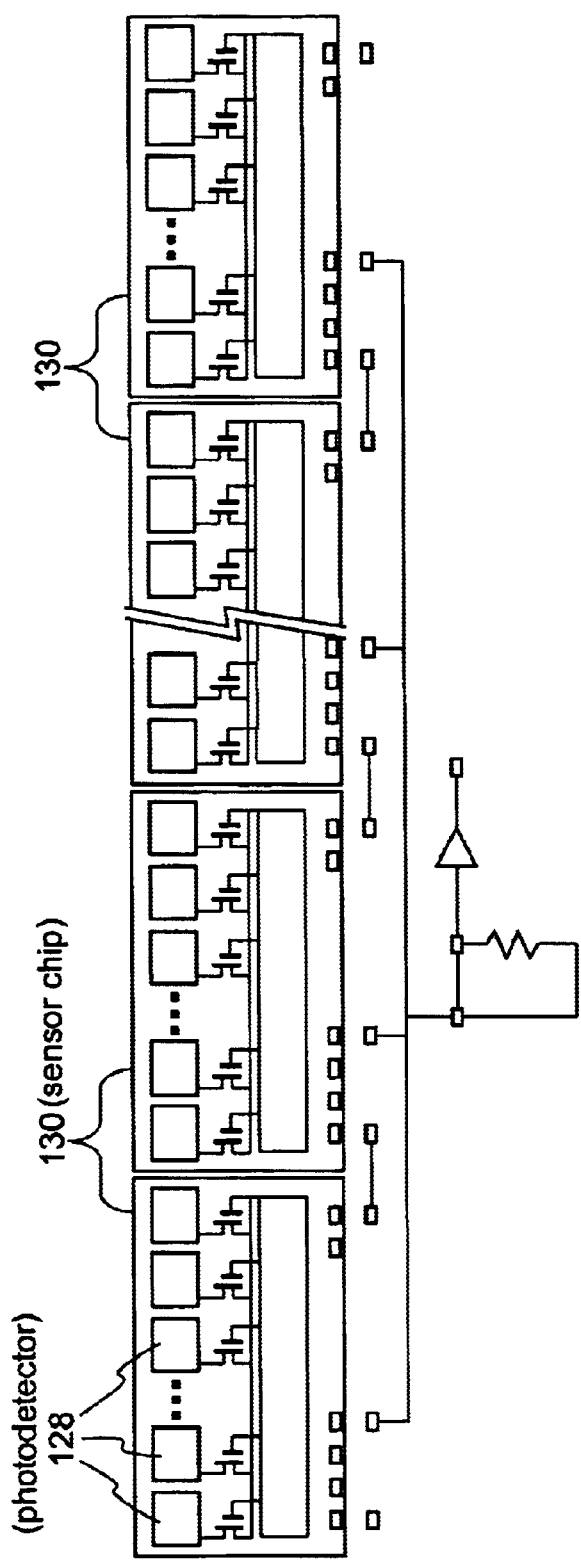

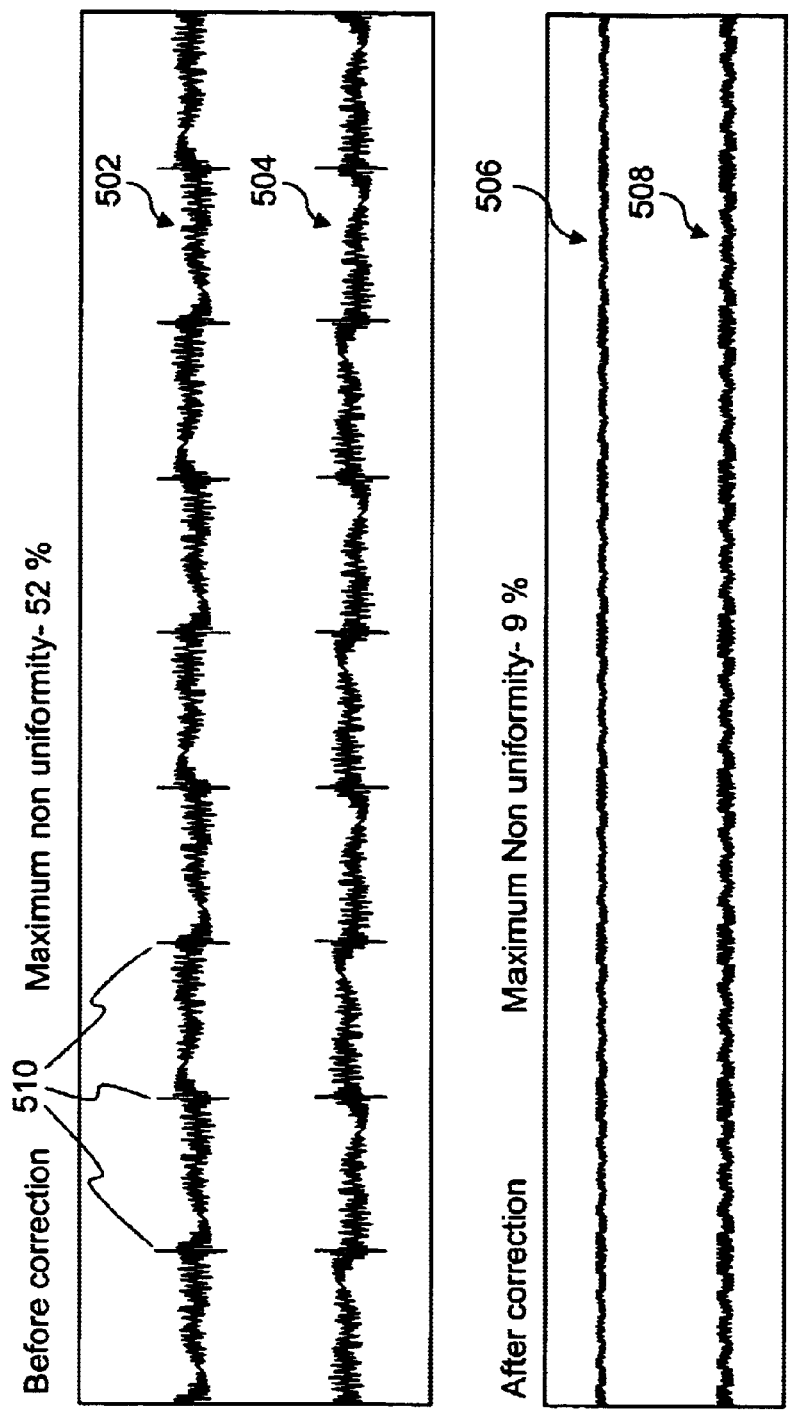

INTEGRATED CIRCUIT ARCHITECTURE OF CONTACT IMAGE SENSOR FOR GENERATING BINARY IMAGES

BACKGROUND OF THE INVENTION

1. Field of the Invention

The present invention generally relates to image sensing systems and more particularly relates to integrated circuit architecture of contact image sensors for generating bi-level or binary images in real time. Images from image sensing systems employing the present invention can be analyzed, archived or transmitted efficiently in applications that rely on binary images, such as check payment verification and optical character recognition.

2. Description of the Related Art

There are many applications that need an imaging system to convert a target to an electronic format that can be subsequently analyzed, printed, distributed or archived. The electronic format is generally a digital image of the target. A typical example of the imaging system is a scanner and the target is a sheet of paper from a book or an article. Through the scanner, an electronic or digital image of the paper is generated and subsequently may be analyzed, computed, or transmitted through the Internet.

An imaging system generally includes an image sensing module that converts a target optically into an image. The key element in the sensing module that converts the target optically to the image is an image sensor comprising an array of photodetectors responsive to light impinged upon the image sensor. Each of the photodetectors produces an electronic signal representing the intensity of light reflected from the target. The electronic signals from all the photodetectors are readout as a video signal that is then digitized through an analog-to-digital converter to produce a digital signal or an image of the target.

FIG. 1A illustrates a configuration system 100 that has been used for the past tens of years. A scanning document 110 that can be a page from an article or book is scanned in by an image sensing system 111 that can be a scanner, such as SCANJET 4100CSE Color Scanner from Hewlett Packard. The output of the scanner is typically a digital image 114 of scanning document 110. Scanner 111 includes an image sensor 112 and an analog-to-digital converter 115. Image sensor 112 generates images 117 that are typically digitized to gray scale or color images of 8-bit precision. Binalization process 116 receives and converts Image 114 to binary Image 118 that is a preferred form for data analysis and understanding in data process 120. Binalization process 116 Is typically implemented in a separate circuit or a software application. The separate circuit may be implemented in a post-processing circuit coupled to A/D converter 115 and the software application may be embedded in a scanner driver or provided in a commercial image editing software, such as Adobe PhotoShop, running in a host computer 119.

FIG. 1B depicts a contact image sensor (CIS) system that can; be used in image sensor 112 of FIG 1A. Scanning document 110 is illuminated by an illumination source 121. Reflected light from scanning document 110 is collected and focused by a full-width rod-lens system 122. The CIS system allows one-to-one scanning of the document because rod lens 122 and an image sensor chip 124 are of the same width as (or greater width than) scanning document 110.

FIG. 1C is a functional block diagram of image sensor 112, along with FIG. 1D showing some detail of the construction of image sensor array 126. To be specific, a plurality of individual sensor chips 130 are butted end-to-end on a single substrate. Each of the individual sensor chips comprises a plurality of photodetectors 128 arranged in a row. In operation, image sensor array 126 is triggered by a start pulse to the first-in-sequence individual sensor chip 130 which serially activates the photodetectors on the first individual sensor chip 130. After the signal from the last photodetector element of the first individual sensor chip 130 is read, an end-of-scan pulse is generated so that the next sensor chip in sequence is triggered.

The number of individual sensor chips chosen is dependent upon the desired width of scanning. Sensor array 126 also comprises necessary circuits to serially activate the individual chips and to readout signals generated from photodetectors. The strength of the signals is directly proportionate to the reflected light from the scanning document. To preserve the contents in the scanning document, most CIS systems produce signals that are subsequently digitized to 8 or 12 bit data by a following analog-to-digital (A/D) converter.

In many imaging applications, such as check verification at checkout counters in a retail store and document archival, the primary interest is to extract texture information from captured images, for example, for optical character recognition (OCR). To be applicable for such process, the images are preferably in binary format, namely the texture information in black and the background in white or vice versa. In other words, the digitized signals from the A/D converter must be binalized.

Considering the cost and processes associated with the subsequent binary images obtained, it will be desirable that a CIS generates directly binary images. Further, the cost of such CIS will be dramatically reduced if it employs no A/D converters to convert a gray-scale image to a bi-level image. A CIS with high performance, low cost and capable of generating the bi-level images will be very well received in the market.

SUMMARY OF THE INVENTION

The present invention has been made in consideration of the above described problems and needs and has particular applications to image systems, such as scanners, digital cameras and computer vision systems. One of the advantages and benefits in the present inventions is the increased performance and reduced cost provided in the underlying architecture. Image sensing modules, especially those contact image sensors, employing the current invention can be effectively used in many imaging applications such as the check verification in checkout counters of retail stores or banks and document archival systems in which binary or bi-level images are preferred.

According to one aspect of the present invention, an image sensing module comprises an image sensor, an amplifier, an analyzing circuit and a comparator. In one particular embodiment, the image sensing module further comprises an electrically erasable programmable read-only memory (EEPROM). The image sensor comprising a number of sensor chips concatenated in series produces a video signal. Each of the sensor chips comprises a plurality of photodetectors; each of the photodetectors producing an electronic signal when the image sensor is activated. In other words, the video signal comprises electronic signals respectively from all the photodetectors in the image sensor.

The amplifier is coupled to the image sensor and receives the electronic signals. The amplifier further receives pairs of gain and offset from a memory or the EEPROM. The electronic signals are adjusted in the amplifier respectively and sequentially in accordance to the pairs of gain and offset;

The analyzing circuit is coupled to the amplifier and receives the adjusted electronic signals. The analyzing circuit produces threshold values from the electronic signals according to a threshold determination procedure. The comparator receives the adjusted electronic signals from the amplifier and the threshold values from the analyzing circuit to generate the bi-level signal from the electronic signals with respect to the threshold values.

The memory or EEPROM is used to store the pairs of predetermined gain and offset; each of the pairs of gain and offset corresponding respectively to one of the photodetectors. In other words, an electronic signals generated from one particular photodetector is registered to be adjusted by a gain and an offset designated to the particular photodetector.

In a preferred embodiment, the amplifier, the analyzing circuit and the comparator are integrated in a substrate that holds the photodetectors. As a result, the real-time binalization-like process is made possible on the one-chip solution. Further the cost of manufacturing image reproduction systems employing the disclosed circuit architecture can be dramatically reduced.

Apart from prior art systems in which a binalization process takes place separately, either in a different circuit or a software process running in a host computer, the circuit architecture in the present invention does not binalize a digital gray-scale image to a digital binary image rather binalize an adjusted video signal based on a real-time supplied dynamic threshold.

According to another aspect of the present invention, the present invention is a method for generating bi-level signals in real time, the method comprising:

producing a video signal from an image sensor comprising a plurality of photodetectors, each of said photodetectors respectively producing an electronic signal when said image sensor is activated; wherein said video signal comprises electronic signals from all of said photodetectors;

adjusting each of said electronic signals sequentially in an amplifier with respect to each of groups of parameters to overcome adverse impacts caused by inherent noises from said image sensor; wherein each of said groups of parameters corresponds to one of said photodetectors;

deriving in an analyzing circuit a dynamic threshold from said video signal; and generating by a comparator a bi-level signal from said video signal in accordance with said dynamic threshold.

Accordingly, one of the objects in the present invention is to provide a contact image sensor providing bi-level image data with high performance and low cost.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 1D shows some detail of the construction of the image sensor in FIG. 1A;

FIG. 5 demonstrates a pair of test signals from an image sensor and a pair of resulting self-calibrated test signals;

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 1A:
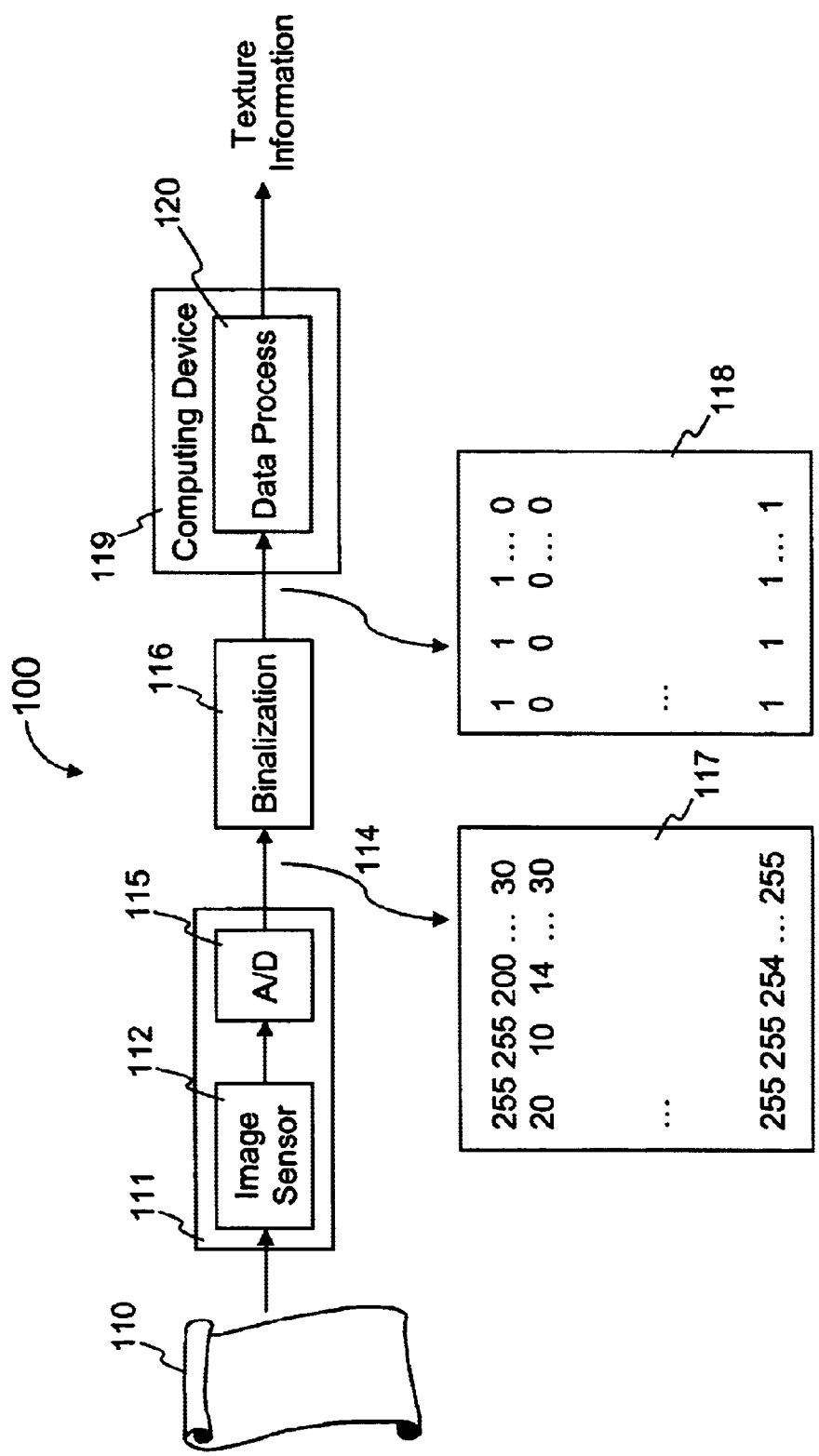
FIG. 1A depicts a configuration system showing an imaging system using an image sensor and an analog-to-digital converter; which has been used for the past tens of years.
Figure 1B:
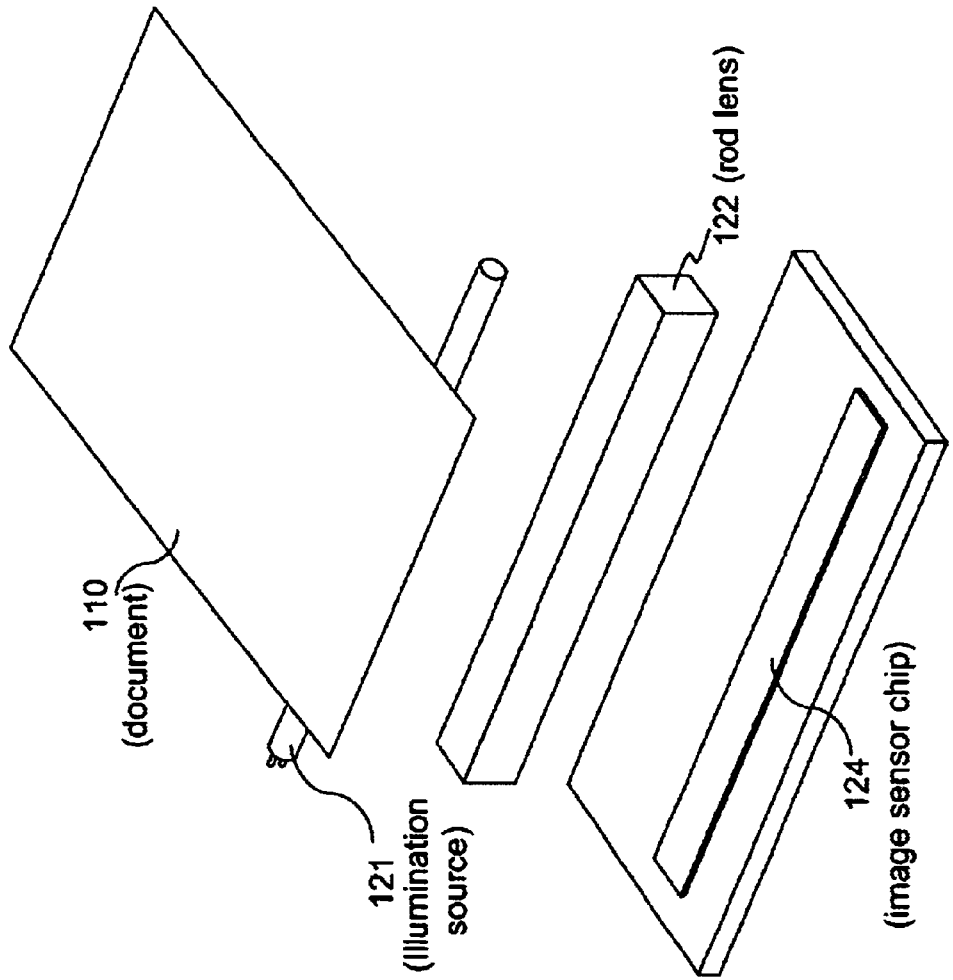
FIG. 1B depicts a contact image sensor (CIS) system that can be used in the image sensor in FIG. 1A.
Figure 1C:
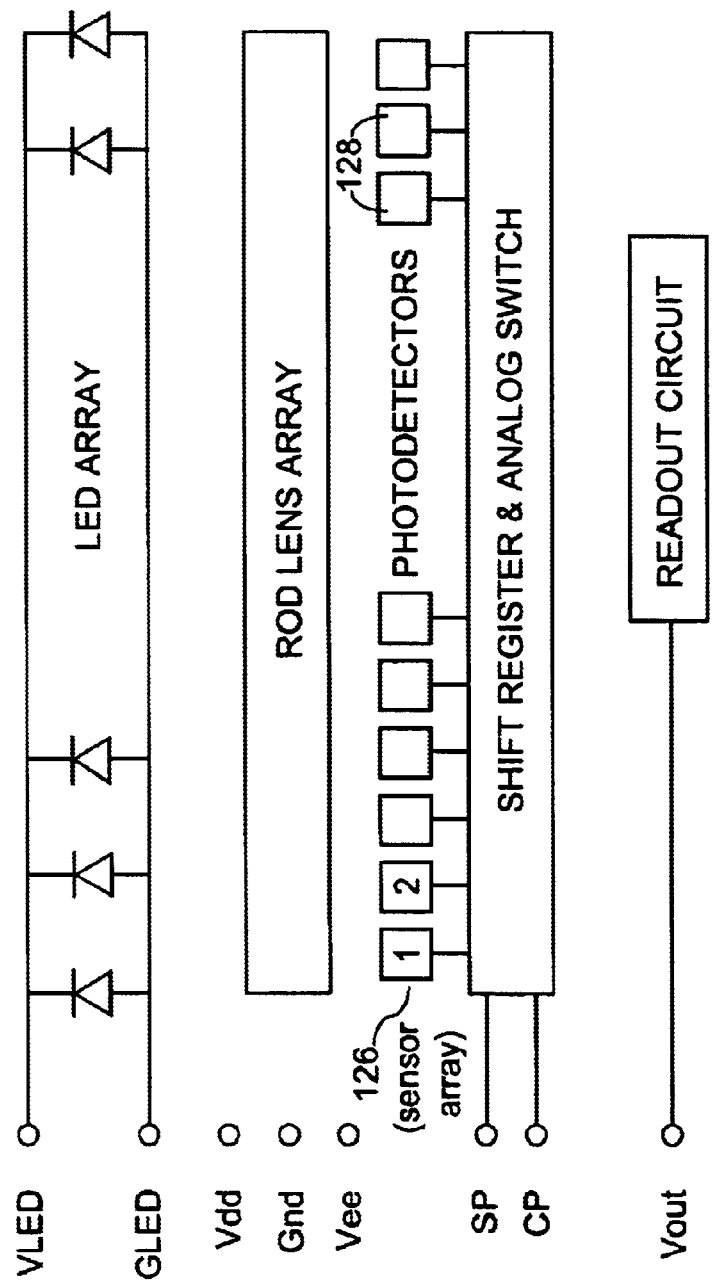
FIG. 1C depicts a functional block diagram of the image sensor in FIG. 1A.
Figure 2:
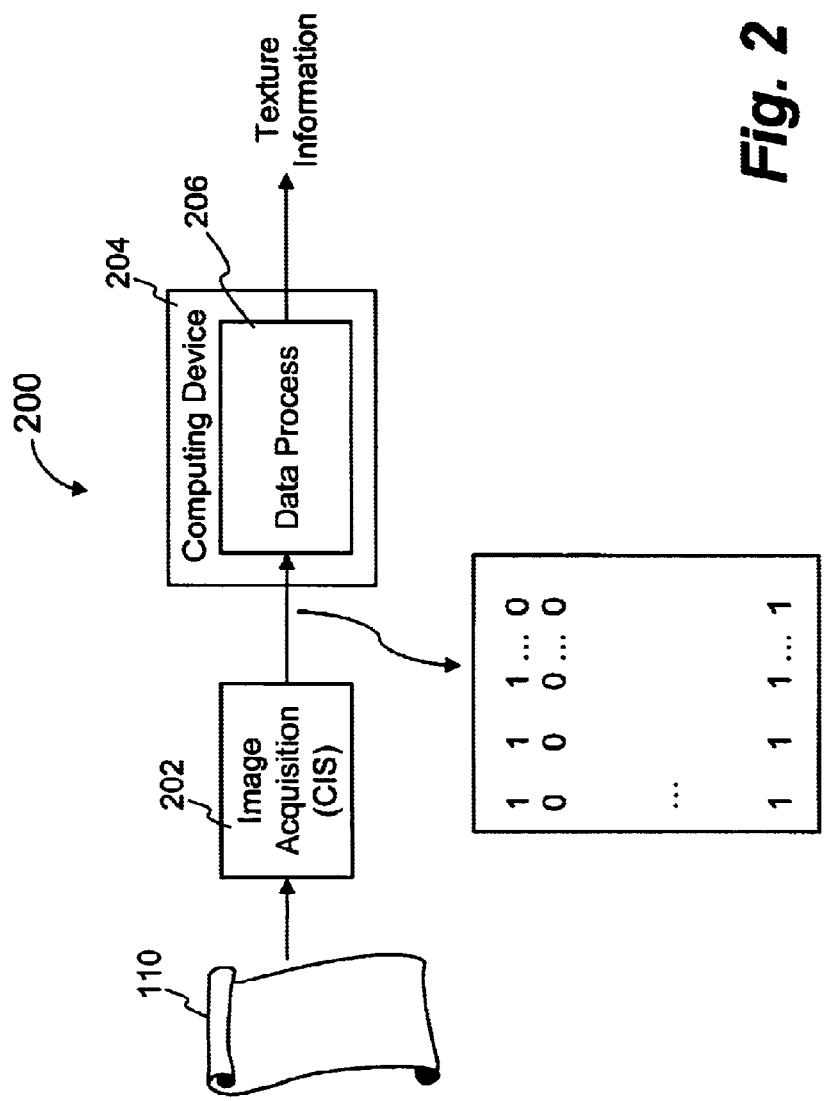
FIG. 2 shows a systematic configuration in which the present invention may be applied.

Referring now to the drawings, in which like numerals refer to like parts throughout the several views. FIG. 2 shows a systematic configuration 200 in which the present invention may be applied thereto. The graphic difference between system 200 hereof and system 100 of FIG. 1A is the elimination of the A/D converter and binalization process, which means that image sensing system 202 now outputs directly binary images that can be directly processed in computing device 204. It appears that the A/D converter and binalization process in FIG. 1A have been absorbed into image sensing system 202, which indeed has been one of the efforts in the past. As described in detail below, the principle and implementation of the present invention is fundamentally different from the efforts to just integrate the A/D converter and binalization process together with an image sensor within a CIS in an imaging system.

As used herein, a gray-scale or gray image means an image presented in multiple intensity levels, for example, an 8-bit gray image means that there are 256 levels to represent varieties of the intensity. Similarly, a binary image means an image having only, two intensity levels either in high or low and may be alternatively referred to as a bi-level, blackand-white or silhouette image. Binary images have several advantages: the most noticeable one is low storage requirement: no more than 1 bit/pixel, often this can be reduced as such images are very amenable to compression (e.g. run-length coding). The next one may be simple processing, namely the algorithms in most cases much simpler and faster than those applied to gray images. Therefore for applications like those check verifications over a teller/retail counter, the binary images may be the most appropriate format.

Figure 3:
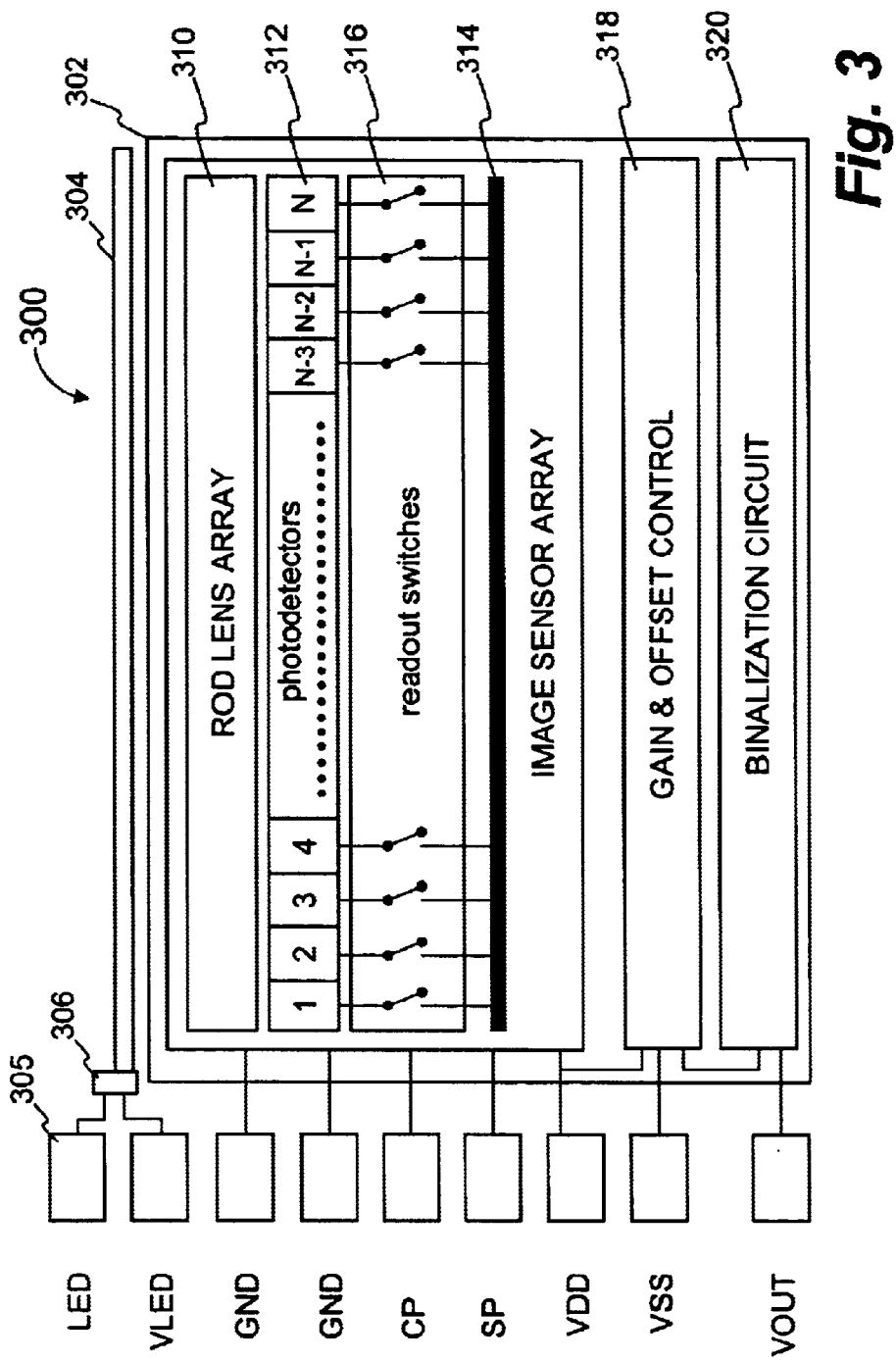
FIG. 3 shows an architecture of a modified CIS employing the present invention.

Referring now to FIG. 3, there is shown a circuit architecture of a modified CIS 300 (e.g. 202 of FIG. 2) employing the present invention. CIS 300 comprises an illumination source that comprises a light guide 304 and a light source 306. Light source 306 may be one or more green LEDs and driven and controlled by an "ON" signal at respective connector 305.

Rod lens array 310 collects reflected light from a scanning object illuminated by the light source and focuses the light onto image sensor 312. Image sensor 312 comprises, for example, N photodetectors. Each of the photodetectors collects light cast thereon during each light integration process and generates an electronic signal. Upon the completion of the Integration process, the electronic signals, each respectively generated by one of the photodetectors, are sequentially readout to the video bus 314 as a scanning or video signal via readout switch array 316. It should be noted that image sensor 312 is assumed a CMOS (Complementary Metal-Oxide Semiconductor) type sensor and those skilled in the art will understand that the description works in the same way for other types of sensors.

Switch array 316 comprises the same number of the readout switches as the number of the photodetectors in image array 312. It is understood to those skilled in the art that each of the readout switches may be implemented by a diode that becomes "On" or "passing through" when a proper voltage is applied across. As shown in the figure, the video signal is sent to gain & offset control circuit 318. The video signal is sequentially processed, including amplified and offset, in gain & offset control circuit 318 with respect to a desired adjustment and then passed to binalization circuit 320. The adjusted signal is processed in binalization circuit 320 and output as a binary signal at Vout.

It should be further pointed out binalization circuit 320 is preferably in the same substrate as those photodetectors 312. One of the advantages of this single chip approach is reduced cost and possible high throughput rate comparing to separate circuits to accomplish the same. What makes this approach possible, however, is one of the key features in the present invention. As described below, there is no A/D converter and no process involved to convert from n-bit data to a binary representation.

Figure 4A:
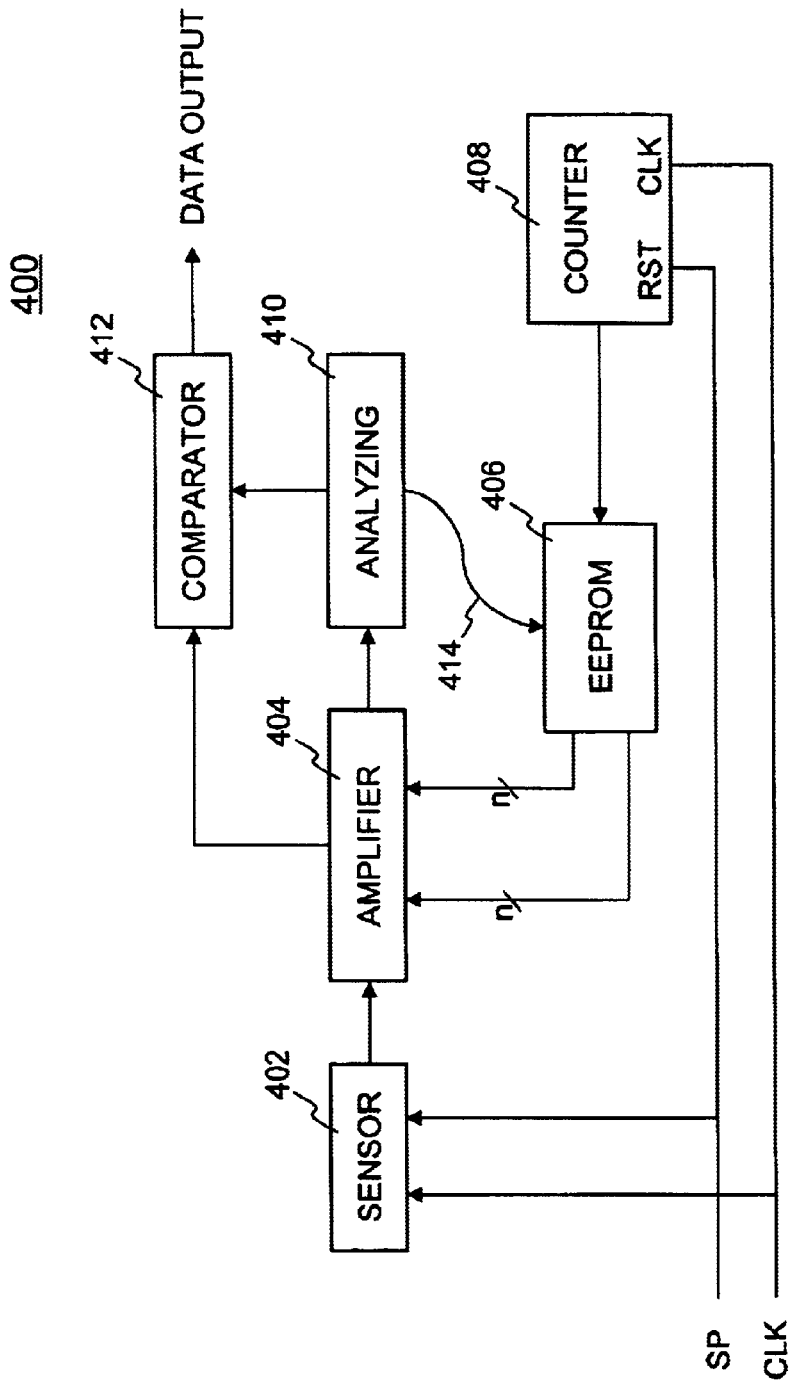
FIG. 4A shows a functional block diagram of an image acquisition system (CIS) according to one embodiment of the present invention.

Referring now to FIG. 4A, there is shown a functional block diagram 400 that may correspond to image acquisition 202 of FIG. 2 or modified CIS 300 of FIG. 3. Electronic signals from image sensor 402 are successively amplified in amplifier 404 that is synchronized and controlled by pairs of parameters (gain and offset) provided by electrically erasable programmable read-only memory (EEPROM) 406. Specifically, amplifier 404 corresponds to gain and offset control 318 of FIG. 3 and adjusts signals respectively for each provided pair of gain and offset.

EEPROM is a user-modifiable read-only memory (ROM) that can be erased and reprogrammed (written to) repeatedly through an application of higher than normal electrical voltage. EEPROM 406 provides successively a pair of appropriate gain and offset to adjust an electronic signal specifically coming from an identified photodetector in image sensor 402. In other words, each pair of gain and offset correspond to one of the photodetectors and respectively derived from a set of test signals from the one of the photodetectors.

As seen in the figure, EEPROM 406 is synchronized by a counter 408 that is clocked by a clock source CLK. On the other hand, the clock source CLK also synchronizes image sensor 402. In one embodiment, for example, when the clock source CLK starts to clock (or output a pulse) after both sensor 402 and counter 408 are initialized by a start pulse (SP), sensor 402 outputs an electronic signal generated from n-th photodetector, counter 408 causes EEPROM 406 to output a pair of gain and offset for the n-th photodetector. The electronic signal is then adjusted in amplifier 404 in accordance with the pair of gain and offset from EEPROM 406. When the clock source CLK starts a next pulse, sensor 402 outputs another electronic signal generated from (n+1)-th photodetector, counter 408 causes EEPROM 406 to output a new pair of gain and offset for the (n+1)-th photodetector. The electronic signal is adjusted in amplifier 404 in accordance with the new pair of gain and offset from EEPROM 406. Successively, all the electronic signals from sensor 402 are respectively adjusted according to respective pairs of gain and offset provided from EEPROM 406. Subsequently, output signals from amplifier 404 are the adjusted electronic signals with minimized errors. A detailed description of deriving gains and offsets for an image sensor to compensate the electronic signals for inherent errors from the sensor itself is provided below.

Amplifier 404 provides adjusted signals to both analyzing circuit 410 and comparing circuit (comparator) 412. Analyzing circuit 410 is designed to trace how the signals from amplifier 404 moves in order to provide an appropriate (dynamic) threshold to comparator 412 to generate a binary data signal.

Figure 4B:
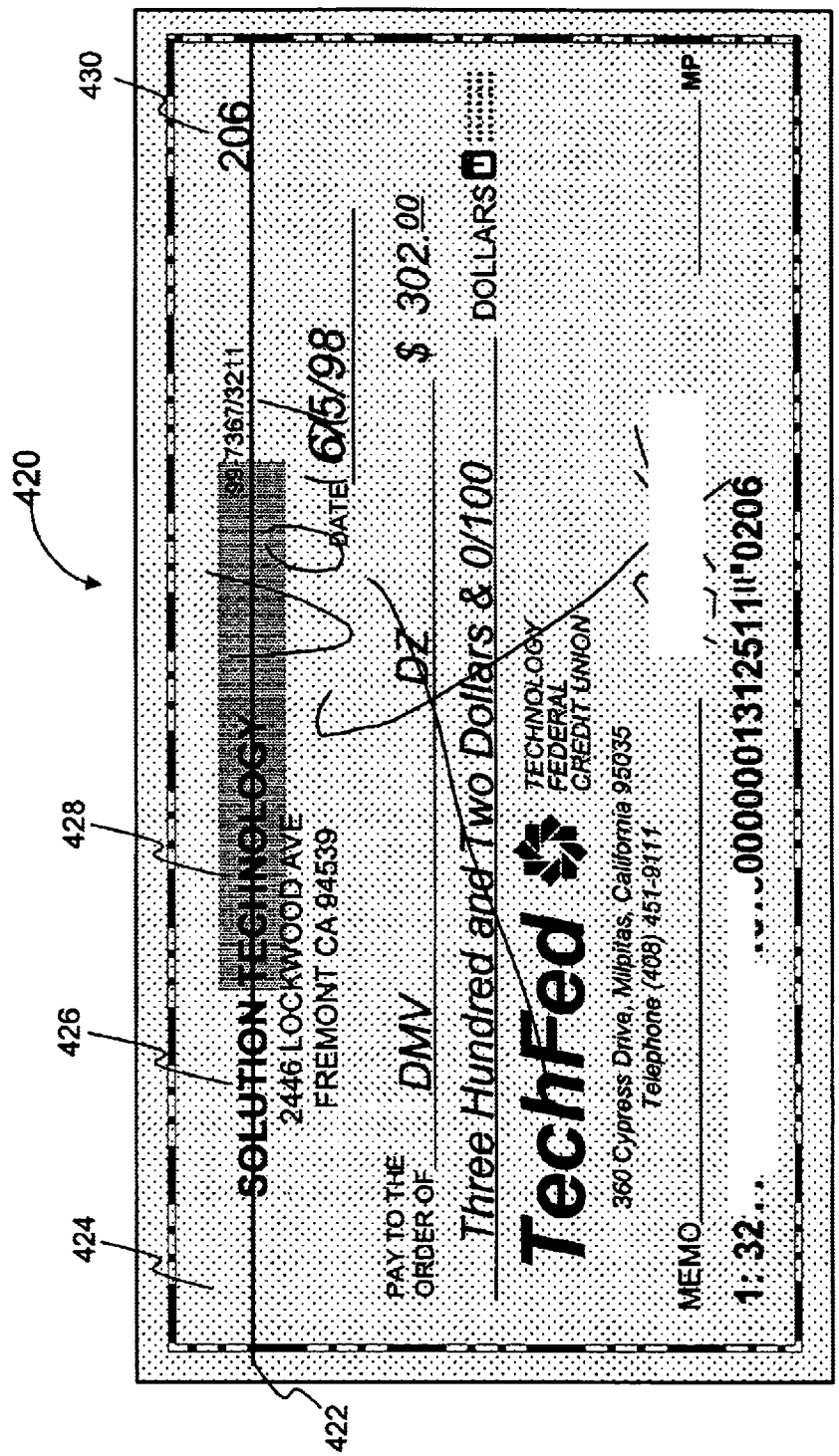
FIG. 4B shows a check as an example of a scanning object.
Figure 4C:
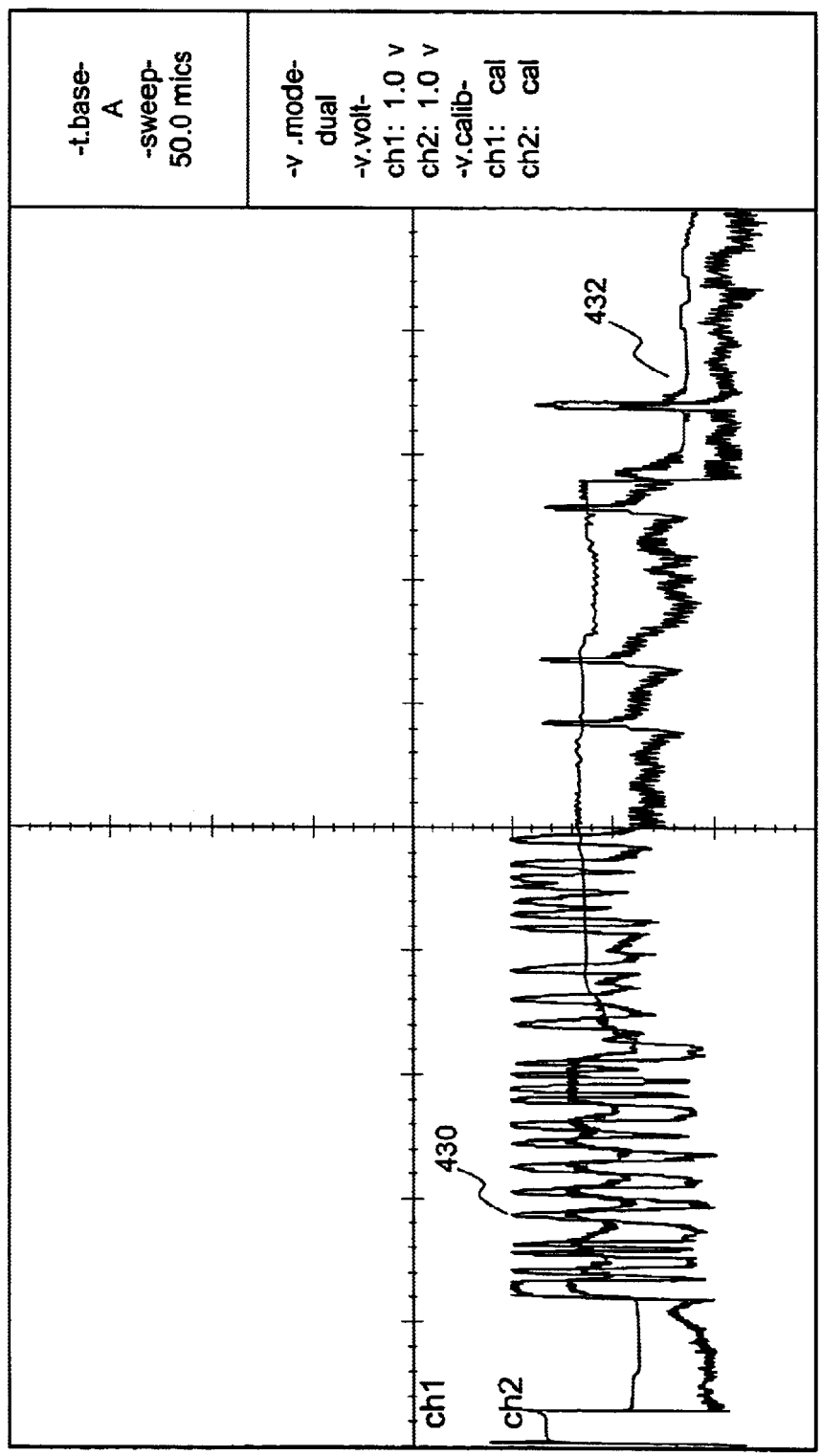
FIG. 4C shows a corresponding (reversed) video signal, obtained from a scanning line in the check.

To fully understand the functional block diagram 400, FIG. 4B shows a check 420 as a scanning object. Line 422 indicates that a particular line on check 420 is being scanned and shows a number of distinctions along the line. As line 422 goes from left to right, it first experiences non-uniform background 424 which typically colorful. Then it hits printed character 426 and is followed by a mark trace 428 and further continues with background 424 and character 430. The corresponding (reversed) video signal 432 (all electronic signals from the photodetectors) is shown in FIG. 4C and from which a binary image needs to be derived.

Ideally, a binary image could be derived from a gray scale image with high contrast, which means signals representing a black area (typical texture information) are distinct from those representing white area (typically background information). With such signal, those skilled in the art understand that a constant threshold (e.g. a voltage) can be readily applied to binalize the signal. However, besides added noises inherently from the photodetectors, video signal 432 presents a challenge that signals representing the black areas are not distinctly separated from those representing the white areas.

Binalization of images has been a long researched topic in the area of image processing and led to many solutions (algorithms) that are typically executed in a computing device. In the present embodiment, an approach of edge-to-edge detection is used. Specifically, analyzing circuit 410 detects a pair of adjacent low and high magnitude points and derives a median or middle value from the low and high magnitude points. The middle value is then supplied to comparator 412 to binalize the set of signals from which the pair of the adjacent low and high magnitude points are obtained.

To be more specific, analyzing circuit 410 first detects that the video signal from the image sensor tends to rise up and marks a maximum magnitude or a nearby point. Analyzing circuit 410 then traces the video signal and subsequently detects that the video signal starts going downward and marks a minimum magnitude or a nearby point. It should be understood that the pair of minimum and maximum magnitudes are a local comparison within that segment of the signal. Therefore a median or middle value between the pair of minimum and maximum magnitudes is only valid for and can be used to binalize this segment of the signal. Those skilled in the art understand that various criteria may be introduced in determining the pair of minimum and maximum magnitudes. Curve 432 is a resultant threshold signal resembling all the middle values (a dynamic threshold) derived from signal 430 and supplied to comparator 412.

With curve 432 as the dynamic threshold, video signal 430 is now readily to be binalized. The binalization means that anything in signal 430 greater than the corresponding value in curve 432 is output as one level and anything in signal 430 less than the corresponding value in curve 432 is output as another level, hence a bi-level signal is generated.

It is understood that analyzing circuit 410 is necessary to determine a dynamic threshold for the video signal from amplifier 404 although there are many ways to derive the dynamic threshold. What is important in the present embodiment is that the process of deriving the dynamic threshold is an on-chip process and capable of supporting real-time performance. Unlike the processes with the similar purposes in prior arts, analyzing circuit 410 hereof provides a dynamically changed threshold value in real time to comparator 412 that meanwhile receives streaming signal 415 from amplifier 404. With the incoming streaming signal 415 and the synchronized threshold value from analyzing circuit 410, comparator 412 produces in real time a streaming bi-level signal. Those skilled in the art are familiar with the implementation and operation of comparator 412, therefore no further details thereof are provided to avoid obscuring other aspects of the present invention.

The forgoing description is based on the assumption that signals generated from the photodetectors in the image sensor faithfully represent the scanning object so that a dynamic threshold can be derived with minimum errors to binalize the signals. In reality, the photodetectors, however, are subject to many deficiencies some of that are described above and could adversely affect the signals and produce errors that are hardly correctable in a bi-level signal representing a scanning line.

Referring now to FIG. 5, there are shown a first pair of test signals 502, 504 and a second pair of resultant corresponding adjusted test signals 506 and 508, all from the same image sensor. Signal 502 is produced when the image sensor is activated to image a complete dark target that is typically from a test sheet. The purpose is to determine the inherent noises from the sensor itself. It can be observed that signal 502 is not what one would have expected, a straight line representing uniformly the dark target, but comprises all sorts of noises, including misaligned sensor noise. As each image sensor chip is made to a certain size, for example, a sensor chip comprises 256 photodetectors, several such sensor chips have to be used and concatenated in series to accommodate a scanning width in a range of several inches to conform to a certain resolution requirement. The misaligned sensor noises, noticeably at 510 can be observed as periodical noises in signal 502. It is not difficult to see that the misaligned sensor noises alone could corrupt a signal so as to misrepresent a scanning line.

Regardless where the noises come from, the noises can, however, cause errors in binalizing signal 502. For example, electronic signals representing a light colored background could be segmented to a level that represents texture information because the noises are inherently added to the electronic signals and thus cause magnitudes in the electronic signals to shrink. Therefore, there must be a process that obtains the characteristics of the noises in each of the photodetectors and calibrates signals from the image sensors to compensate for the errors caused by the noises.

One of the features in the present invention is what is called self-calibration of image sensors. Traditional approaches rely largely on a process embedded in a driver that comes along with a sensing device, for example, a scanner driver loaded into a host computer that operates and synchronizes a scanner. After images data are acquired, the process is activated to calibrate the data to minimize the errors with respect to predefined parameters in the process. The approaches are difficult to support the real-time performance.

Figure 6:
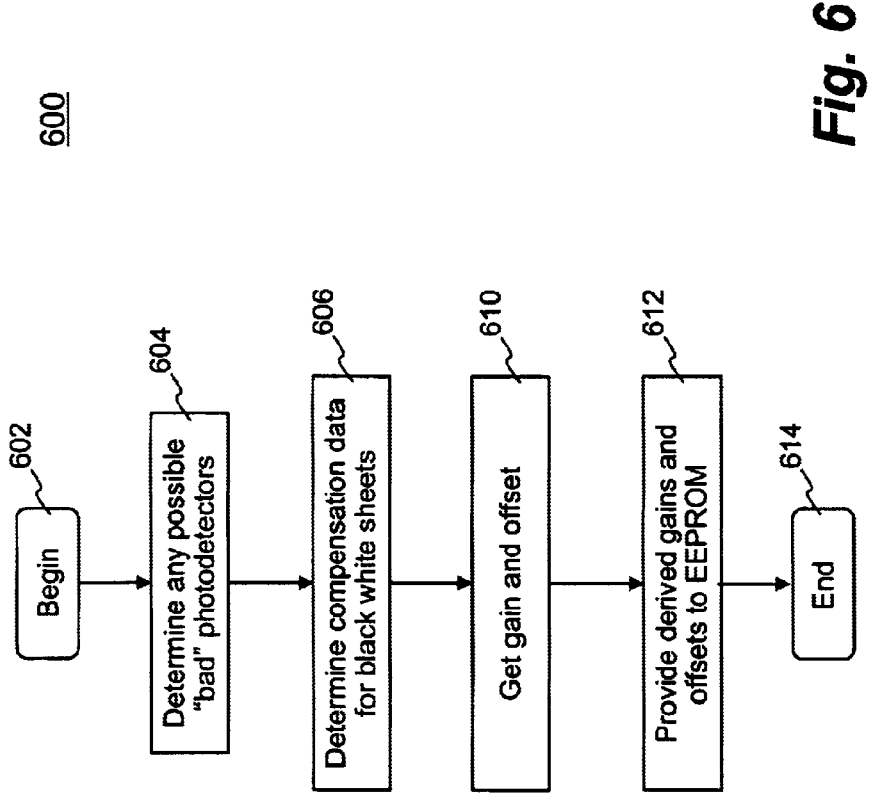
FIG. 6 illustrates a self-calibration process for an image sensor according to one embodiment of the present invention and should be understood in conjunction with FIG. 4A.

Referring now to FIG. 6, there is shown a self-calibration process 600 of an image sensor according to one embodiment of the present invention and should be understood in conjunction with FIG. 4A. Certain procedures in process 600 are typically repeated twice, one for a black (dark) test sheet and one for a white test sheet. The black test sheet and white test sheet provide two extreme situations from which two basic parameters, gain and offset, can be obtained.

For various reasons, some of the photodetectors in the image sensor may not produce valid signals. To avoid undesirable signals from those photodetectors, at 604, one or more lines of scanning signals are acquired to detect if there are any undesirable magnitudes in the acquired scanning signals. For example, given a dark sheet, amplifier 404 outputs an amplified signal that is coupled to analyzing circuit 410. Ideally, the signal should be a constant (straight line). Because of the noises from the photodetectors, the signal possesses variations. Analyzing circuit 410 determines if there are any individual signals with magnitudes off a certain percentage, for example ±50%. If there are such signals, those corresponding photodetectors that produce the signals are respectively labeled, which means that signals from these photodetectors are either discarded or need special processing when real scanning signals come. With known benchmarks (for both test sheets, but mainly for the black sheet), an array of offsets or offset(i) corresponding respectively to the photodetectors are collected.

At 606, process 600 is moved to get compensation data for both test sheets, i.e. black and white colors. It is known that the sensitivity of the image sensor to the colors of a scanning document, the reflected light thereof, and illumination from an elongated illumination source are not necessarily uniform. To avoid any biased signals result from the non-uniformity, an array of pairs of magnitudes, each corresponding to one of the photodetectors, must be collected with respect to the black and white test sheets. Typically, sensor 402 takes a couple of hundreds of scanning on a given test sheet, signals are respectively amplified in amplifier 404 and an average signal is determined in analyzing circuit 410 from the signals. To be specific, the average signal for the white sheet is kept in $W(i)$ and for the black sheet is kept in $B(i)$, where $i=1, 2 \ldots N$.

At 610, an array of pairs of gain and offset are determined in analyzing circuit 410 for each of the photodetectors. It is known to those skilled in the art that there are many ways to determine the gains. Given W(i), B(i), and offset(i) as well as benchmarks (signals) for the test sheets, gain(i) can be uniquely determined.

Each of the photodetectors now has its own gain and offset (a pair). The array of pairs of gain and offset are stored in EEPROM 406 that causes signals from sensors 402 to be adjusted in amplifier 404. When a signal is generated from a particular photodetector, the signal is adjusted in amplifier 404 with its own registered gain and offset provided from EEPROM 406. As an example, signals 506 and 508 are a pair of resultant signals, respectively corresponding to signals 502 and 504, adjusted with gains and offsets from EEPROM 406. It can be observed that the noises present in the original signals have been much reduced. Statistically, the non-uniformity has been reduced from 52% to 9%, a significant reduction in this example.

Figure 7:
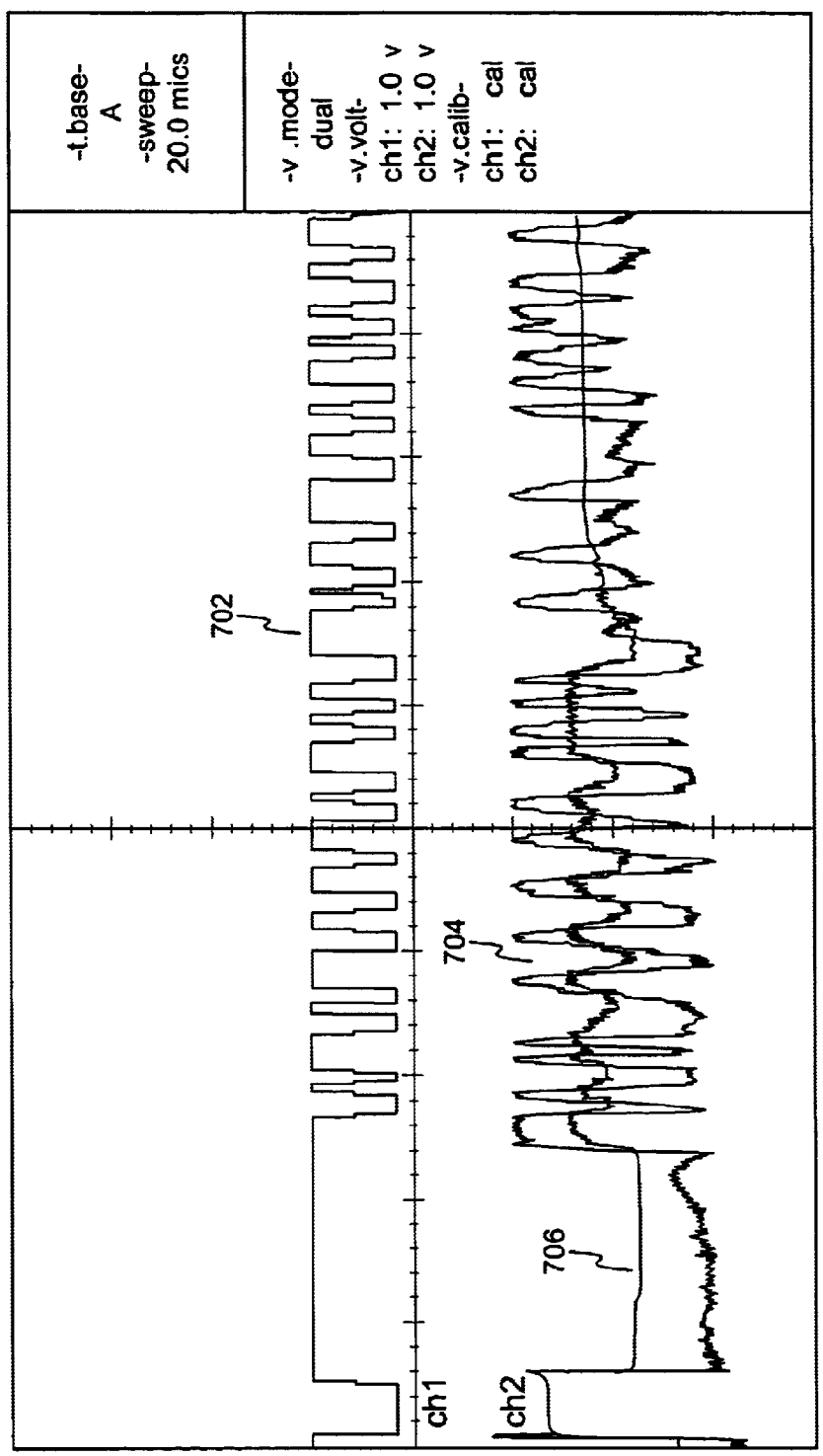
FIG. 7 illustrates resultant bi-level signal from a comparator, the bi-level signal is generated from an adjusted signal in accordance with a dynamic threshold.

As a practical example, FIG. 7 illustrates resultant (binary) signal 702 from comparator 412, the low and high magnitudes represent respectively two distinct groups of information. Signal 702 is generated from input adjusted signal 704 with respect to dynamic threshold signal 706 provided by EEPROM 406.

Figure 8:
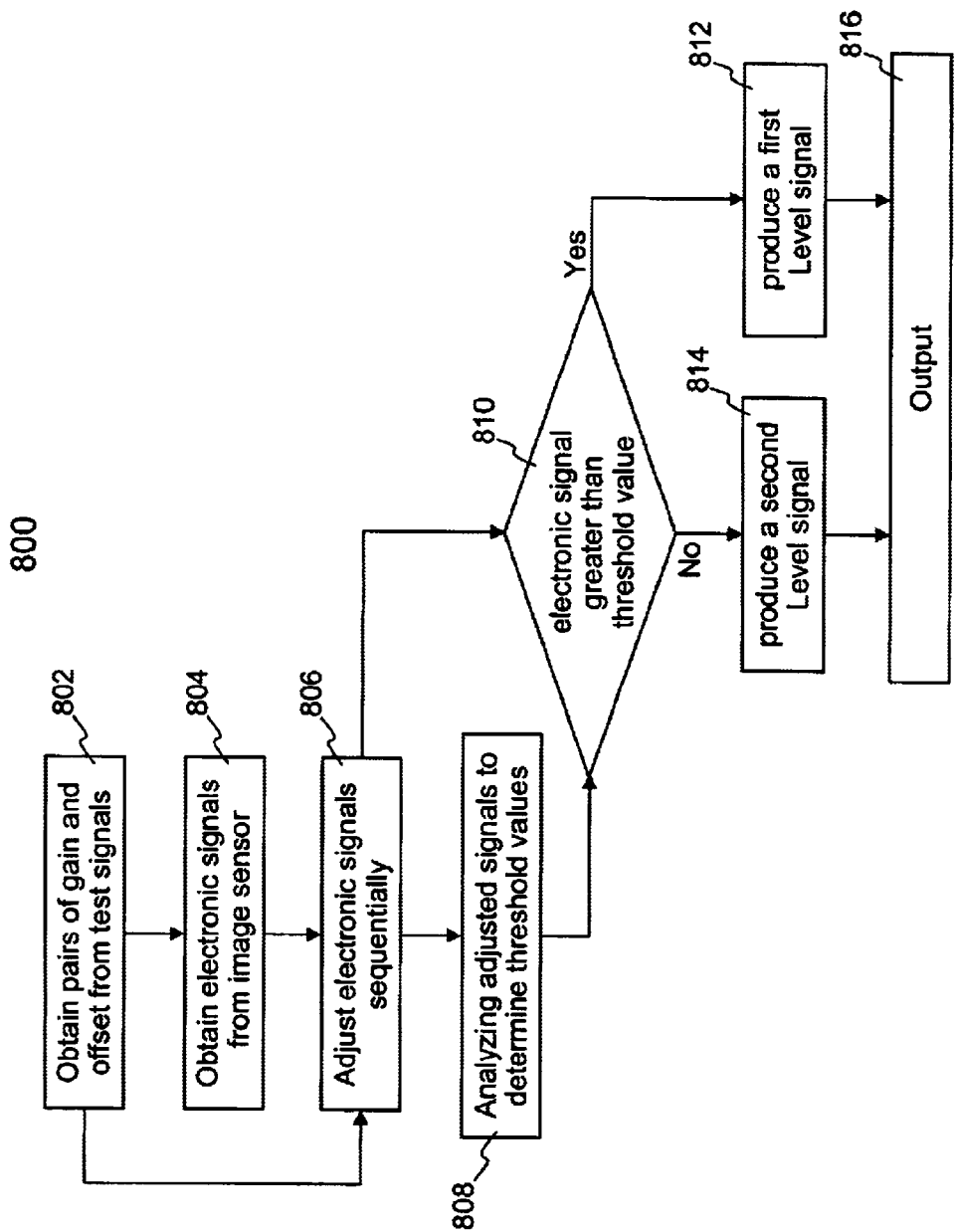
FIG. 8 shows a process flowchart of the present invention according to one embodiment.

FIG. 8 shows a process flowchart 800 according to one embodiment of the present invention. At 802, an array of pairs of gain and offset are obtained. FIG. 6 is one of the implementations that can be used at 802. Typically, if there are N photodetectors in an image sensor, there are N pairs of gain and offsets stored in a memory. At 804, the image sensor is in normal operation, generating electronic signals (a video signal) to represent a scanning line of a scanning object. The electronic signals are then adjusted or amplified at 806 in accordance with the gains and offsets in the memory.

At 808, the adjusted electronic signals are analyzed to determine a threshold value for each of the electronic signals. The threshold value is meanwhile sent to 810 in which a comparison process takes place. To be specific, if an incoming adjusted electronic signal has a magnitude larger than the derived threshold value, a first level signal is generated at 812. Conversely, if the incoming adjusted electronic signal has a magnitude smaller than the derived threshold value, a second level signal is generated at 814. The first or second level signal can be adjusted according to a specific application and has no impact on the operation of the present invention. Outputs from both 812 and 816 are combined to produce a bi-level signal that may be used for a host computer to perform analysis, compression, or transmission.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, not just gain and offset, there can be more parameters used to adjust signals from an image sensor. Accordingly, the scope of the present invention is defined by the appended claims rather than the forgoing description of embodiments.

I claim:

1. A circuit architecture for producing a binary image, said architecture comprising:

an image sensor to produce an analog video signal, said image sensor comprising a plurality of photodetectors, each producing an electronic signal when said image sensor is activated, said analog video signal comprising electronic signals respectively from said photodetectors;

an amplifier coupled to said image sensor and receiving said analog video signal, said amplifier further receiving an array of pairs of gain and offset, each of said pairs of gain and offset corresponding to one of said photodetectors, said amplifier adjusting said analog video signal sequentially according to each of said array of pairs of gain and offset;

an analyzing circuit coupled to said amplifier and receiving said analog video signal, said analyzing circuit producing a dynamic threshold from said analog video signal according to a threshold determination procedure, wherein the threshold determination procedure includes determining a sequence of middle values, each of the middle values determined from a high value and a low value in a locale of said analog video signal; and a comparator receiving said adjusted analog video signal from said amplifier and said dynamic threshold from said analyzing circuit, said comparator generating said binary image from said analog video signal with respect to said dynamic threshold.

2. The circuit architecture as recited in claim 1, further comprising an electrically erasable programmable read-only memory (EEPROM), said EEPROM providing said array of pairs of gain and offset.

3. The circuit architecture as recited in claim 2, wherein said EEPROM is in synchronization with a clocking source that meanwhile synchronizes said image sensor so that said EEPROM provides said array of pairs of gain and offset sequentially to said amplifier to adjust said analog video signal from said image sensor.

4. The circuit architecture as recited in claim 1, wherein said dynamic threshold varies adaptively with said electronic signals.

5. The circuit architecture as recited in claim 4, wherein said comparator outputs first level signals when magnitudes in said analog video signal are greater than said corresponding threshold and outputs second level signals when magnitudes in said analog video signal are less than said corresponding threshold.

6. The circuit architecture as recited in claim 1, wherein said amplifier, said analyzing circuit, and said comparator are integrated in a substrate that holds said image sensor so that said circuit architecture is a single-chip architecture.

7. The circuit architecture as recited in claim 6, wherein said substrate is Complementary Metal-Oxide Semiconductor (CMOS).

8. The circuit architecture as recited in claim 1, wherein said analyzing traces dynamically said analog video signal to determine a plurality of adjacent pairs of high and low points so as to determine said dynamic threshold.

9. A method for producing a binary image, said method comprising:

producing an analog video signal from an image sensor comprising a plurality of photodetectors, each of said photodetectors respectively producing an electronic signal when said image sensor is activated, wherein said analog video signal comprises electronic signals from all of said photodetectors;

adjusting each of said electronic signals sequentially in an amplifier with respect to each of groups of parameters to overcome adverse impacts caused by inherent noises from said image sensor, wherein each of said groups of parameters corresponds to one of said photodetectors and derived through a self-calibration process with at least a test sheet so that undesirable signals can be detected from said image sensor to tune the parameters, wherein the test sheet does not have a known reflectivity but provides one of two extreme cases;

deriving, in an analyzing circuit, a dynamic threshold from said analog video signal, and generating by a comparator a bi-level signal from said analog video signal in accordance with said dynamic threshold.

10. The method as recited in claim 9, wherein each of said groups of parameters includes a gain and an offset and each of said photodetectors corresponds to a pair of gain and offset.

11. The method as recited in claim 10, wherein said gain and offset are provided from an electrically erasable programmable read-only memory (EEPROM).

12. The method as recited in claim 11, wherein said EEPROM is in synchronization with a clocking source that meanwhile synchronizes said image sensor so that said pair of gain and offset provided from said EEPROM corresponds to said electronic signal from said each of said photodetectors.

13. The method as recited in claim 12, wherein said amplifier, said analyzing circuit, and said comparator are integrated in a substrate that holds said image sensor so that said circuit architecture is a single-chip architecture.

14. The method as recited in claim 13, wherein said substrate is Complementary Metal-Oxide Semiconductor (CMOS).

15. A circuit architecture for producing a bi-level signal, said architecture comprising:

an image sensor producing an analog video signal, said image sensor comprising a number of sensor chips concatenated in series, each of said sensor chips comprising a plurality of photodetectors, each of said photodetectors producing an electronic signal when said image sensor is activated, said analog video signal comprising electronic signals respectively from said photodetectors in all of said sensor chips;

an electrically erasable programmable read-only memory (EEPROM) storing pairs of predetermined gain and offset, each of said pairs of gain and offset corresponding respectively to one of said photodetectors and derived through a self-calibration process with at least a test sheet so that undesirable signals can be detected from said image sensor to tune the parameters;

an amplifier coupled to said image sensor and receiving said electronic signals, said amplifier further receiving said pairs of gain and offset from said EEPROM, said amplifier adjusting said electronic signals respectively and sequentially in accordance to each of said pairs of gain and offset;

an analyzing circuit coupled to said amplifier and receiving said electronic signals, said analyzing circuit producing threshold values from said electronic signals according to a threshold determination procedure, wherein the threshold determination procedure includes determining a sequence of middle values, each of the middle values determined from a high value and a low value in a locale of said analog video signal; and a comparator receiving said adjusted electronic signals from said amplifier and said threshold values from said analyzing circuit, said comparator generating said bi-level signal from said electronic signals with respect to said threshold values.

16. The circuit architecture as recited in claim 15, wherein said amplifier, said analyzing circuit, said EEPROM, and said comparator are integrated in a substrate that holds said image sensor so that said circuit architecture is a single-chip architecture.

17. The circuit architecture as recited in claim 16, wherein said substrate is Complementary Metal-Oxide Semiconductor (CMOS).

18. The circuit architecture as recited in claim 17, wherein said EEPROM is in synchronization with a clocking source that meanwhile synchronizes said image sensor so that said pair of gain and offset provided from said EEPROM corresponds to said electronic signal from said each of said photodetectors.

19. The circuit architecture as recited in claim 18, wherein said pairs of predetermined gain and offset are respectively obtained by measuring electronic test signals on a black test target and a white test target.

* * * * *